United States Patent [19]
Tippmann et al.

[11] Patent Number: 5,960,869
[45] Date of Patent: Oct. 5, 1999

[54] SUPPORT SURFACE FOR HEATING FOOD ARTICLES AND THE METHOD OF MAKING SAME

[76] Inventors: Joseph R. Tippmann, HRC-33, Box 8419, Rapid City, S. Dak. 57701; Vincent P. Tippmann, 8605 N. River Rd., New Haven, Ind. 46774

[21] Appl. No.: 08/911,026

[22] Filed: Aug. 14, 1997

[51] Int. Cl.⁶ .................. F28F 9/26; F28F 13/06
[52] U.S. Cl. ............. 165/144; 165/171; 165/174; 165/183; 165/DIG. 484
[58] Field of Search ................. 165/144, 171, 165/183, DIG. 484, 174; 126/660

[56] References Cited

U.S. PATENT DOCUMENTS

| | | | |
|---|---|---|---|
| 287,621 | 10/1883 | Burkhard | 165/171 |
| 3,209,820 | 10/1965 | Lauterbach | 165/174 |
| 3,621,671 | 11/1971 | Ullrich | 165/56 X |
| 4,416,265 | 11/1983 | Wallace | 165/171 X |
| 4,679,617 | 7/1987 | Keldmann | 165/56 |

*Primary Examiner*—Allen Flanigan
*Attorney, Agent, or Firm*—Joseph J. Baker, Esq.

[57] ABSTRACT

A support surface is disclosed for transferring heat from a source to food articles placed adjacent said surface and having a plurality of heat conductive support elements each with at least one passageway therethrough, tubular means in each passageway and having a portion thereof extending beyond the ends of said passageways, and header or tubular means for interconnecting adjacent extending portions of said tubular means for transferring therebetween heated fluid from said source. The method of making the support surface is also disclosed.

1 Claim, 3 Drawing Sheets

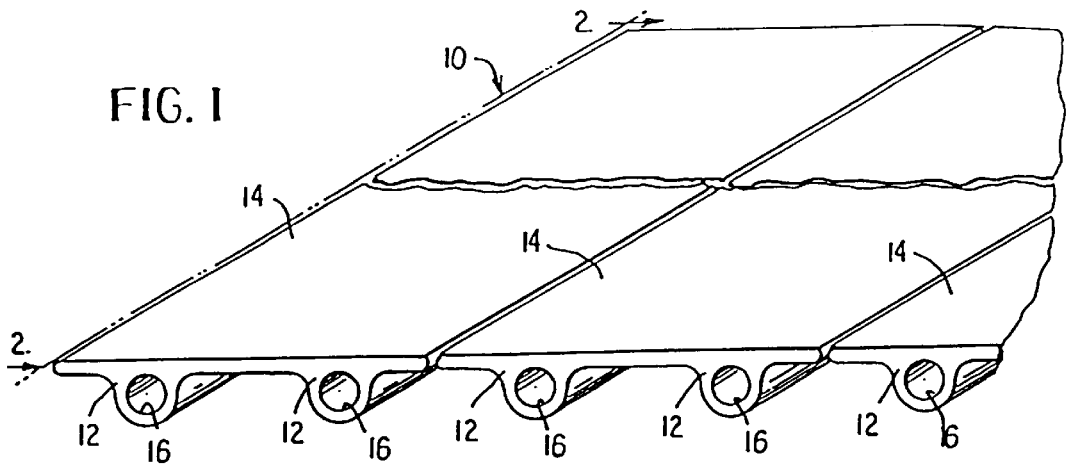
FIG. 1
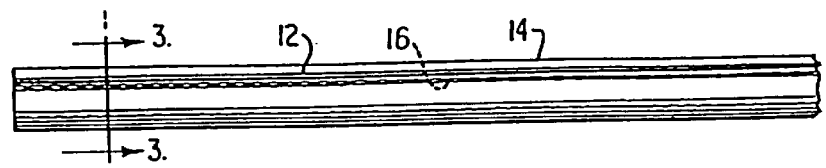
FIG. 2
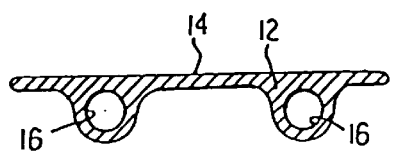
FIG. 3
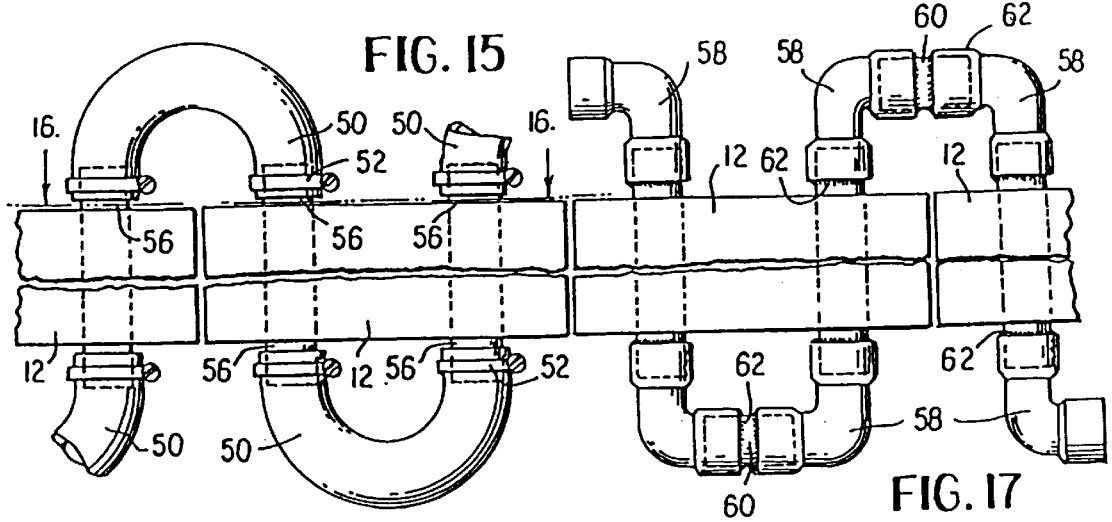
FIG. 15
FIG. 17
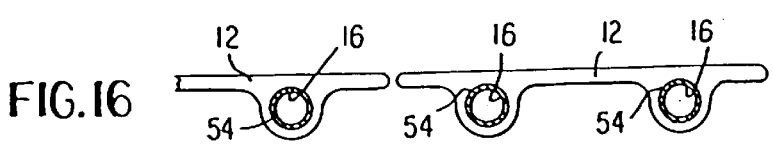
FIG. 16

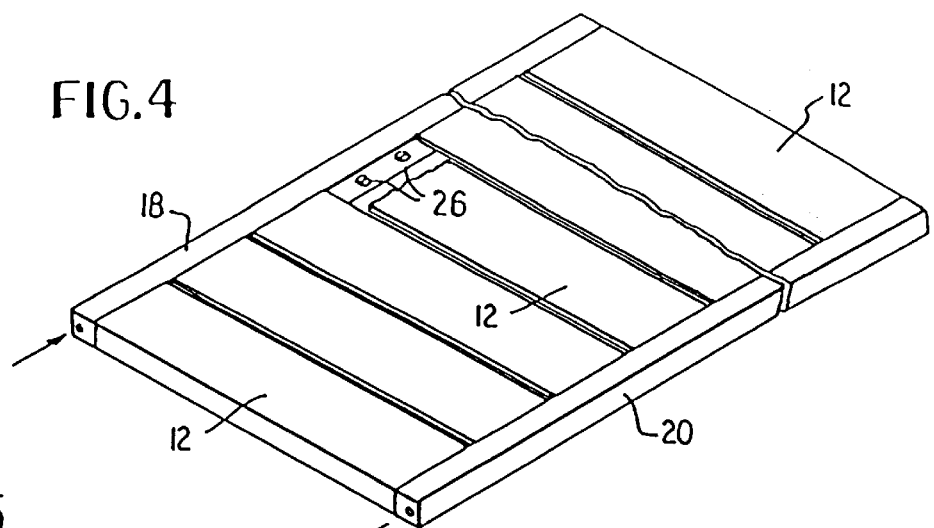
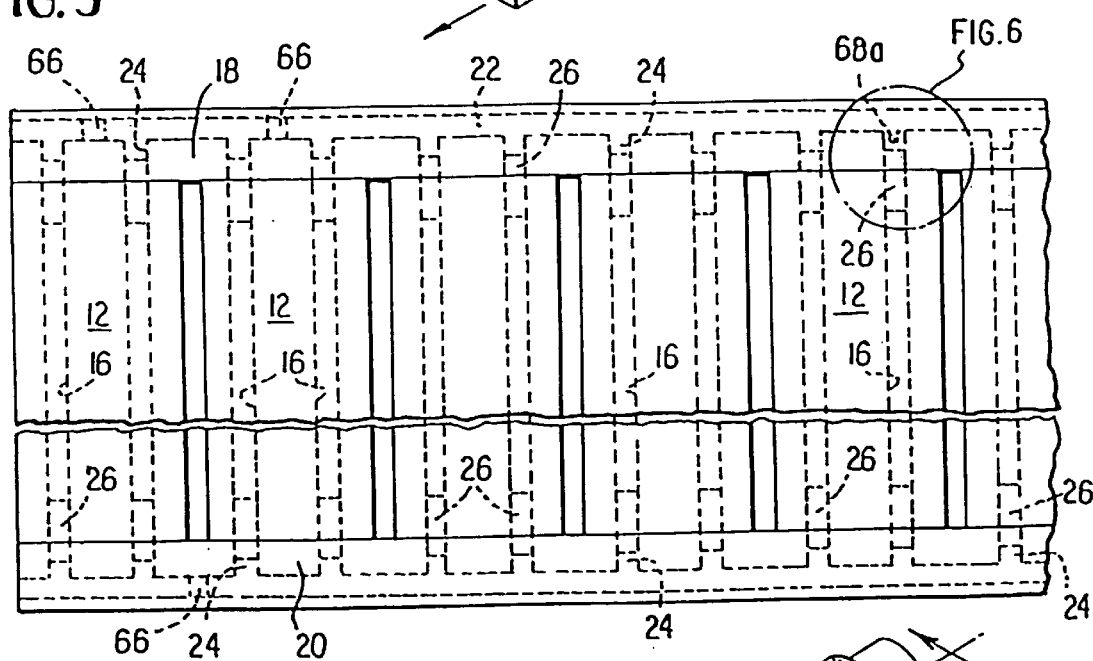
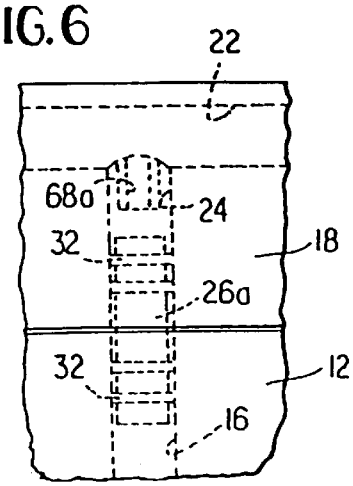
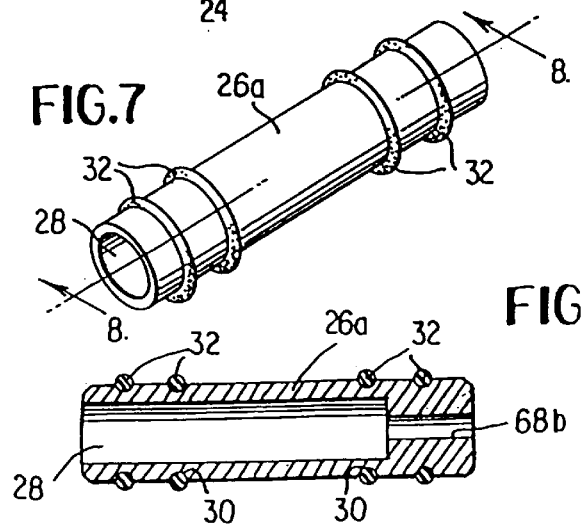
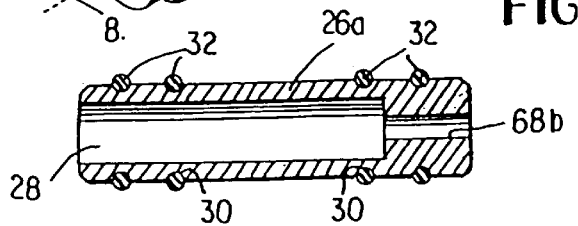

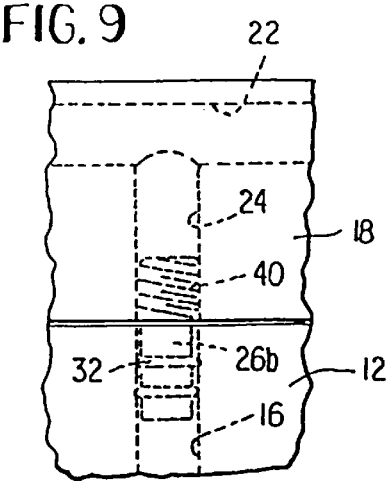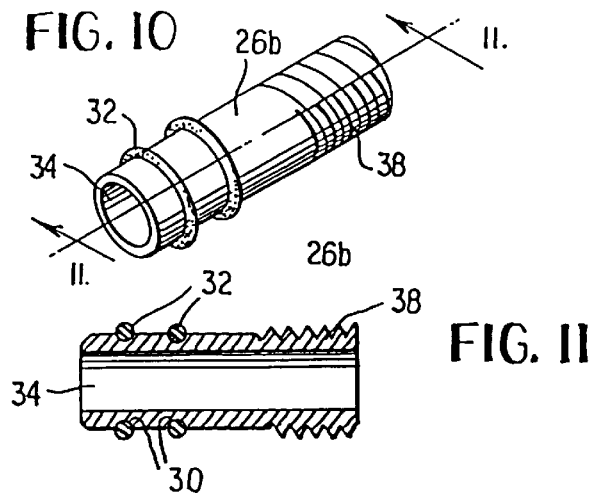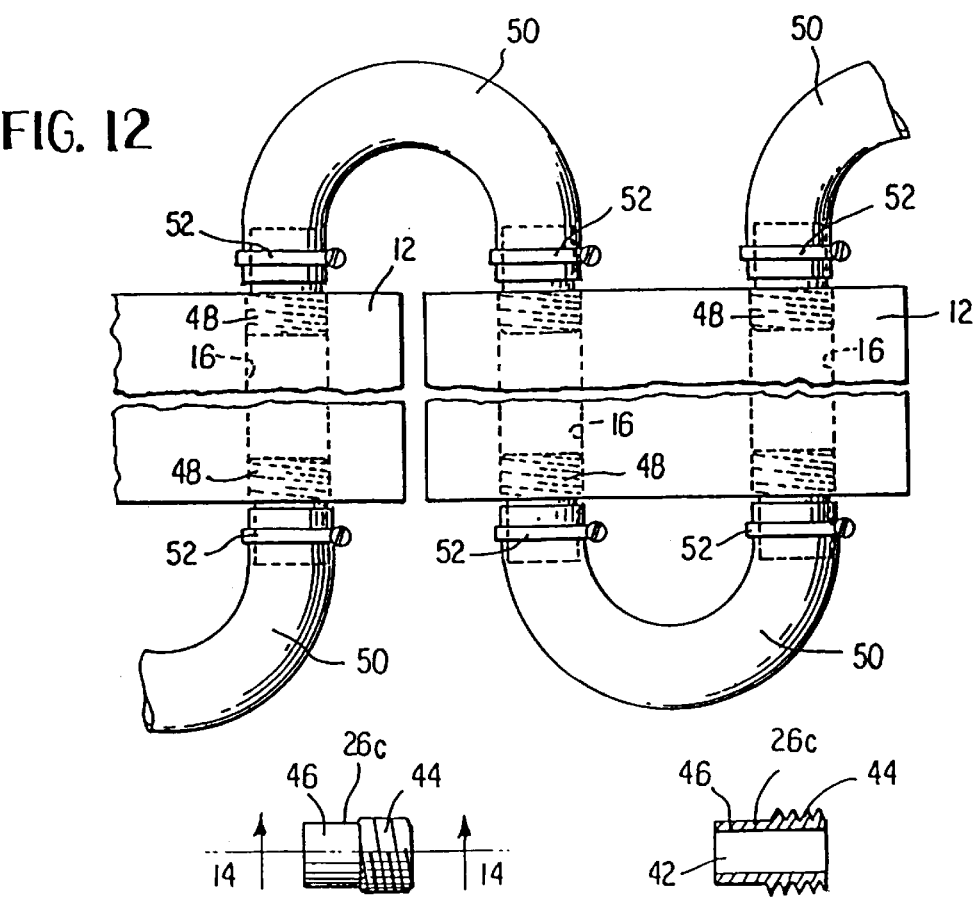

25,960,869

1

SUPPORT SURFACE FOR HEATING FOOD ARTICLES AND THE METHOD OF MAKING SAME

BACKGROUND OF THE INVENTION

This invention relates to a support surface for transferring heat from a source to food articles placed adjacent the surface and, more particularly, to a support surface comprising a plurality of side-by-side extruded support elements having fluid passageways therethrough and a novel means of interconnecting the passageways of adjacent support elements.

The support surface is generally of the type adapted for use in a cooking and cooling apparatus, as set forth in our U.S. Pat. No. 5,086,693, as well as other methods of cooking such as grilling.

Briefly, the support surface is formed by taking a plurality of individual support elements having a substantially flat upper surface and one or more longitudinally extending passageways through it for heated fluid such as water or steam. Tubular means is provided for insertion into the passageways and having a portion thereof extending beyond the ends of the passageways. A header system or additional tubular means can be attached to these end portions for transferring the heated fluid from the passageway of one support element to the passageway of an adjacent support element. The tubular means can comprise a single tubular element which is inserted into and through the entire length of the passageway and expanded into engagement with the side wall of the passageway by compressed air or other pressurized fluid such as oil or water to thereby greatly improve the heat transfer characteristics between the tubular element and the support element. The tube could also be expanded by a mandrel drawn therethrough or the tube could be reduced in diameter or shrunk by subjecting it to low temperature prior to insertion into the passageways. The ends of the single tubular element can be interconnected by flexible base sections clamped thereto or pipe fittings soldered or sweated therebetween. The tubular means can also comprise a plurality of tubular nipple-like elements, one positioned in each end of the passageway and having a portion thereof extending beyond the ends of the passageway. If the passageways are to be connected to a header system having apertures in alignment with the ends of the passageway, the tubular elements can have O-ring seals adjacent the ends thereof for sealing engagement with the walls of the passageways and apertures. The tubular elements and passageways could be in threaded engagement on one end and have O-rings on the other end or be plain on the other end for receiving a flexible hose, pipe fitting or the like. In addition, the apertures in the header could be sized to form an orifice to balance flow through all adjacent parallel tubular element passageways or the tubular elements connecting the apertures to the passageways could themselves be sized to balance flow therethrough.

It is therefore the primary object of the present invention to provide a superior support surface for heating food articles.

It is another object of the present invention to provide a novel means of interconnecting the fluid passageways of adjacent support surfaces.

It is yet another object of the present invention to provide a novel method of making the subject support surface.

Other objects and advantages of the present invention will become apparent and obvious from a study of the following description and accompanying drawings, which are merely illustrative of the present invention.

BRIEF DESCRIPTION OF THE DRAWINGS

FIG. 1 is a perspective view of a plurality of support elements of the present invention in side-by-side relationship;

FIG. 2 is a side elevational view of the support elements of FIG. 1 taken along the lines 2—2 of FIG. 1;

FIG. 3 is a cross-sectional view taken along the lines 3—3 of FIG. 2;

FIG. 4 is a perspective view with a partial breakaway of an assembled support surface of one embodiment of the present invention;

FIG. 5 is a plan view of the support surface of FIG. 4 in schematic form;

FIG. 6 is an enlarged view of the circled portion in FIG. 5 using one embodiment of the tubular element of the present invention;

FIG. 7 is a perspective view of the tubular element shown in FIG. 5;

FIG. 8 is a cross-sectional view of the tubular element taken along lines 8—8 of FIG. 7; FIG. 9 is an enlarged view of the circled portion in FIG. 5 using another embodiment of the tubular element of the present invention;

FIG. 10 is a perspective view of the tubular element of FIG. 9;

FIG. 11 is a cross-sectional view taken along lines 11—11 of FIG. 10;

FIG. 12 is a plan view of the use of another embodiment of a tubular element in support elements of the present invention;

FIG. 13 is a perspective view of the tubular element of FIG. 12;

FIG. 14 is a cross-sectional view taken along lines 14—14 of FIG. 13;

FIG. 15 is a plan view of the use of another embodiment of a tubular element in support elements of the present invention using one means of interconnecting the tubular elements;

FIG. 16 is a cross-sectional view taken along the lines 16—16 of FIG. 15; and FIG. 17 is a plan view of the use of another means of interconnecting the tubular elements.

DETAILED DESCRIPTION OF THE INVENTION

Referring now to the drawings where like characters of reference indicate like elements in each of the several views, numeral 10 in FIG. 1 refers generally to a plurality of support elements 12 of the present invention arranged in side-by-side relationship. The support elements 12 are typically made by extruding a metal such as aluminum into a shape having a flat upper surface 14 and one or more longitudinally extending passageways 16. For purposes of illustration, a support element 12 having two passageways 16 per element as shown in FIGS. 2 and 3. The upper surface 14 can be TEFLON coated if desired.

When the support elements 12 are arranged in side-by-side relationship as shown in FIG. 4 and connected to headers 18, 20, they provide a planar support surface on which food articles such as beef, chicken, etc. can be placed usually in a pan or tray (not shown) placed adjacent the planar surface. If a heated or cooled fluid such as water is then passed through the passageways 16 of the support elements 12 (see arrows) as disclosed in our above referred to U.S. Pat. No. 5,086,693, the food articles on the aforementioned tray can be heated or cooled depending on the temperature of the fluid.

The manner of the fluid interconnection of the fluid passageways 16 of each support element 12 with the headers 18, 20 or each other to form a continuous fluid circuit from a source of heated or cooled fluid through the entire support surface and back to the source is the primary subject of the present invention.

The headers 18, 20, as will be seen in FIG. 5, each have a longitudinally extending through bore 22 and a plurality of spaced-apart transverse bores 24 in communication with the bore 22. When the support elements 12 are arranged in side-by-side relationship, as shown in FIGS. 4 and 5, the end of the passageways 16 are in alignment with the transverse bores 24 of the headers 18, 20. In order to provide a fluid tight means for the passage of the aforementioned heat transfer fluid, a connector in the form of a tubular element 26 is shown extending a distance into and between each of the transverse bores 24 and passageways 16 of the headers 18, 20 and support elements 12, respectively.

In one embodiment, the tubular element 26 is shown and referred to in FIGS. 6–8 by numeral 26(a) and having a through bore 28 and one or more spaced-apart circumferential grooves 30 adjacent each end thereof. An O-ring seal 32 of elastomeric material resides in each of the grooves 30. As the tubular elements 26(a) are inserted into the respective aligned passageways 16 and bores 28, the O-ring seals 32 engage the walls thereof to provide a fluid tight seal in a well known manner.

In a second embodiment, the tubular element 26 is shown and referred to in FIGS. 9–11 by numeral 26(b) and having a through bore 34 and one or more spaced-apart circumferential grooves 36 adjacent one end only. The other end of element 26(b) has a plurality of threads 38 which mate with corresponding threads 40 in transverse bores 24 in headers 18, 20. The tubular elements 24b are first screwed into the threaded bores 40 and then are inserted into passageways 16 of the headers 18, 20 and support elements 12, respectively, to again form a fluid tight seal. It being understood, of course, that conversely the passageways 16 could be threaded to receive the threaded end 38 and the transverse bores 24 be smooth to accommodate the O-ring seals 32.

In a third embodiment, the tubular element 26 is shown and referred to in FIGS. 12–14 by numeral 26(c) and having a through bore 42 and threads 44 on one end thereof. The other end 46 of element 26(c) is cylindrical. As can be seen specifically in FIG. 12, the tubular elements 26(c) are screwed into threaded cores 48 of the support elements 12. A flexible tubular hose 50 is then positioned over the cylindrical ends 46 of adjacent elements 26(c) and maintained in fluid tight relationship therewith by clamps 52 in a well known manner. As can be seen by referring to FIG. 5, if the through bores 22 in the headers 18, 20 are unobstructed, the flow of fluid in passageways 16 is parallel through the plates 12 from header 18 to header 20. However, by the strategic insertion of plugs 66 (shown in phantom), made of flexible material such as rubber, in the through bores 22, the flow through the passageways 16 of plates 12 and headers 18, 20 can be made serpentine rather than parallel. If it is desired to balance or equilibrate the flow through bores 24 and passageways 16 of adjacent support elements 12 when arranged for parallel flow (no plugs 66), orifices 68a as shown in phantom in FIGS. 5 and 6 can be formed in transverse bores 24 or the orifice 68b can be formed in the tubular elements 26a–26c as shown, for example, in FIG. 8

In a fourth embodiment, the tubular element is a continuous length of tubing 54 such as copper which is longer than the length of passageways 16. The tubing 54 is inserted into the passageway 16 of each support element 12 leaving a short portion 56 extending beyond the ends of the passageways 16. After insertion of the tube 54 in a passageway 16, a fluid (not shown) such as air, water, oil or the like is passed through the tube 54 under pressure sufficient to expand the tube 54 into better heat conductive relationship with the wall constituting the passageway 16. A mandrel (not shown) can also be drawn through the tube 54 thus expanding it into engagement with passageway 16 or the tube 54 could be super cooled to thus decrease its diameter to permit insertion into passageway 16 whereupon cooling the tube 54 would expand to effect a tight fit with passageway 16. Alternatively, the support element 12 itself can be brought under pressure to force the passageway 16 into heat conductive engagement with the tube 54. The short end portions 56 of each of the tubes 54 are connected to end portions 56 of adjacent tubes 54 by means of hose 50 and clamps 52 as shown and described with regard to embodiment three to thereby form a serpentine channel for the transfer fluid to pass between support elements 12 as shown in FIGS. 15 and 16.

Referring to FIG. 17, if the transfer fluid is of a very high temperature and/or pressure, the hose 50 and clamp 52 arrangement can be eliminated and metal L-shaped, pipe-type fittings 58 and nipples 60 can be used. These fittings 58, 60 would be connected to each other and the end portions 56 by solder 62 in a well known manner. Further, the same pipe-type fittings 58, 60 could be used to connect cylindrical-shaped ends 46 of embodiment three by soldering or welding 62 instead of using hose 50 and clamps 52 as shown in FIG. 12.

Applicants have thus described in detail their novel support surface comprising a plurality of support elements and the various methods of interconnecting the passageways through each support element to form a fluid tight circuit in serpentine-form for the passage of a heated or cooled transfer fluid. Such a support surface can be adapted for use in an oven described in aforementioned U.S. Pat. No. 5,086,693 as well as many other similar uses.

It is apparent that many modifications and variations of this invention as hereinbefore set forth may be made without departing from the spirit and scope thereof. The specific embodiments described are given by way of example only, and the invention is limited only by the terms of the appended claims.

We claim:

1. A support surface for transferring heat from a source to food articles placed adjacent said surface, said support comprising:
   a) a plurality of longitudinally extending support elements made of heat conductive material placed in side-by-side relationship to form a substantially planar heating surface, each of said support elements having at least one longitudinal passageway therethrough extending from a first to a second end thereof for carrying a heated transfer fluid,
   b) first and second header means adjacent said first and second ends, respectively, each header means having a plurality of interconnected apertures each of which is in alignment with a corresponding passageway in said support elements, and
   c) a plurality of individual tubular elements, each element having one end inserted in one of said apertures and the other end of each of said elements inserted in one of said support element passageways corresponding thereto for transferring said heated fluid from said header means to each of said support elements, each of said tubular elements having an orifice formed therein which is sized to equilibrate the flow of fluid through said corresponding passageway, each of said tubular elements further having at least one O-ring seal adjacent each end thereof which engage apertures and corresponding passageways to form a fluid tight seal therebetween.

* * * * *